US012700594B2

(12) United States Patent　　　　(10) Patent No.:　US 12,700,594 B2
Harada et al.　　　　　　　　　　　(45) Date of Patent:　　　Aug. 4, 2026

(54) CARBON BLACK, SLURRY, AND LITHIUM-ION SECONDARY BATTERY

(71) Applicant: Denka Company Limited, Tokyo (JP)

(72) Inventors: Yusaku Harada, Tokyo (JP); Yuji Koga, Tokyo (JP)

(73) Assignee: Denka Company Limited, Tokyo (JP)

( * ) Notice: Subject to any disclaimer, the term of this patent is extended or adjusted under 35 U.S.C. 154(b) by 609 days.

(21) Appl. No.: 18/254,778

(22) PCT Filed: Dec. 2, 2021

(86) PCT No.: PCT/JP2021/044309
§ 371 (c)(1),
(2) Date: May 26, 2023

(87) PCT Pub. No.: WO2022/118924
PCT Pub. Date: Jun. 9, 2022

(65) Prior Publication Data
US 2024/0006615 A1　　Jan. 4, 2024

(30) Foreign Application Priority Data

Dec. 4, 2020　　(JP) ................................. 2020-202022

(51) Int. Cl.
H01M 4/62　　　　(2006.01)
H01M 10/0525　　(2010.01)
*H01M 4/02*　　　　(2006.01)
(52) U.S. Cl.
CPC ....... H01M 4/625 (2013.01); H01M 10/0525 (2013.01); *H01M 2004/021* (2013.01)

(58) Field of Classification Search
CPC ....... H01M 10/0525; H01M 2004/021; H01M 4/13; H01M 4/139; H01M 4/62; H01M 4/625; Y02E 60/10
See application file for complete search history.

(56) References Cited

U.S. PATENT DOCUMENTS

2011/0217229 A1　9/2011　Inomata et al.
2015/0125381 A1　5/2015　Wong
2019/0177551 A1　6/2019　Nagai et al.

FOREIGN PATENT DOCUMENTS

CA　　　2990338 A1 *　1/2017　.............. C08K 3/04
CN　　　102165022 A　　8/2011
CN　　　105283514 A　　1/2016
CN　　　106663808 A　　5/2017
CN　　　109643802 A　　4/2019
(Continued)

OTHER PUBLICATIONS

The International Bureau of Wipo, International Preliminary Report on Patentability issued in International Application No. PCT/JP2021/044309 (Jun. 15, 2023).
(Continued)

*Primary Examiner* — Victoria H Lynch
(74) *Attorney, Agent, or Firm* — Leydig, Voit & Mayer, Ltd.

(57)　　　　　ABSTRACT

Carbon black having a specific surface area of 150 m²/g or more and 400 m²/g or less, and a ratio $(S_2/S_1)$ of a peak area $(S_2)$ of a peak at m/z 128 to a peak area $(S_1)$ of a peak at m/z 57 detected through thermal desorption spectroscopy of less than 2.00.

7 Claims, 2 Drawing Sheets

PEAK AT m/z 57

PEAK AT m/z 128

0　　100　　200　　300　　400　　500　　600　　700　　800

TEMPERATURE (°C)

(56)     References Cited

FOREIGN PATENT DOCUMENTS

| CN | 210419828 | U | 4/2020 |
|---|---|---|---|
| CN | 111278767 | A | 6/2020 |
| EP | 2351798 | A1 | 8/2011 |
| EP | 3506402 | A1 | 7/2019 |
| EP | 3298082 | B1 | 9/2019 |
| JP | S50-049185 | A | 5/1975 |
| JP | S62-054764 | A | 3/1987 |
| JP | H01-188568 | A | 7/1989 |
| JP | 2000-053883 | A | 2/2000 |
| JP | 2006-213767 | A | 8/2006 |
| JP | 2007-204531 | A | 8/2007 |
| JP | 2014-193986 | A | 10/2014 |
| JP | 2014-221889 | A | 11/2014 |
| JP | 2018-522977 | A | 8/2018 |
| KR | 1020160010399 | A | 1/2016 |
| WO | WO 2010/035871 | A1 | 4/2010 |
| WO | WO 2014/185452 | A1 | 11/2014 |
| WO | WO 2017/005921 | A1 | 1/2017 |
| WO | WO 2018/037910 | A1 | 3/2018 |
| WO | WO 2019/046320 | A1 | 3/2019 |

OTHER PUBLICATIONS

State Intellectual Property Office, Office Action issued in Chinese Patent Application No. 202180075058.0 (Aug. 31, 2023).
State Intellectual Property Office, Office Action issued in Chinese Patent Application No. 202180075058.0 (Jan. 11, 2024).
Wang et al., "Coal Chemical Technology", Higher Education "12th Five-Year" Plan textbooks, First edition, China University of Mining and Technology Press, 361 (Sep. 30, 2014).
Japan Patent Office, International Search Report issued in International Application No. PCT/JP2021/044309 (Feb. 1, 2022).
European Patent Office, Extended European Search Report issued in European Patent Application No. 21900674.9 (Apr. 3, 2024).

* cited by examiner

PEAK AT m/z 57

PEAK AT m/z 128

TEMPERATURE (°C)

PEAK AT m/z 57

PEAK AT m/z 128

TEMPERATURE (°C)

CARBON BLACK, SLURRY, AND LITHIUM-ION SECONDARY BATTERY

CROSS-REFERENCE TO RELATED APPLICATIONS

This patent application is the U.S. national phase of International Application No. PCT/JP2021/044309, filed on Dec. 2, 2021, which claims the benefit of Japanese Patent Application No. 2020-202022, filed Dec. 4, 2020, the disclosures of which are incorporated herein by reference in their entireties for all purposes.

TECHNICAL FIELD

The present invention relates to carbon black, a slurry and a lithium ion secondary battery.

BACKGROUND ART

Lithium ion secondary batteries are widely used as power sources for small electronic devices such as smartphones and tablet computers. Lithium ion secondary batteries are generally composed of electrodes, separators, and electrolytic solutions. An electrode is produced by applying a mixture slurry in which an active material, a conductive agent, a binder and the like are dispersed in a dispersion medium onto a metal plate for a current collector and drying it to form a mixture layer.

As the conductive agent, for example, carbon black is used (for example, Patent Literature 1).

CITATION LIST

Patent Literature

[Patent Literature 1] Japanese Unexamined Patent Publication No. 2014-193986

SUMMARY OF INVENTION

Technical Problem

A role of the conductive agent is to form a conductive path within the electrode. Therefore, if particles aggregate in the electrode, parts having poor conductivity appear locally, the active material is not effectively used, and the discharging capacity decreases, which results in deterioration of battery characteristics.

In recent years, there has been a demand for increasing the capacity of lithium ion secondary batteries, and there has been a tendency to increase a proportion of the active material added into the mixture layer and decrease a proportion of the conductive agent and the binder added. If the proportion of the conductive agent added decreases, it becomes difficult to form a conductive path in the electrode, and battery characteristics deteriorate. Therefore, a study to improve conductivity by increasing the number of particles per unit mass using a conductive agent having a small particle size, reducing the distance between the conductive agent particles in the electrode, and increasing the number of contact points between the active material and the current collector has been performed. However, if the specific surface area increases as the particle size of the conductive agent decreases, since the viscosity of the mixture slurry increases significantly, uniform dispersion becomes difficult.

In addition, when carbon black is used as the conductive agent, the structure of carbon black affects the conductivity and slurry viscosity. Here, the structure of carbon black is a structure in which primary particles are connected. The structure of carbon black develops in a complex entangled shape as the particle size of primary particles decreases. If the structure is developed, it is possible to efficiently form a conductive path in the electrode, but if the dispersion state is poor, the effect cannot be sufficiently exhibited.

In order to achieve high dispersion of the conductive agent and reduce the viscosity of the mixture slurry, studies on performing dispersion by applying strong collision energy with a device such as a high pressure jet mill and extending a dispersion treatment time has been performed, but problems such as contamination with impurities due to wear of the device have been faced. In addition, addition of a dispersing agent has also been studied, but there have been problems that, if the amount of the dispersing agent added increases as the particle size of the conductive agent decreases, battery characteristics deteriorate.

Here, an object of the present invention is to provide a novel carbon black which has a large specific surface area and allows a low-viscosity slurry to be formed. In addition, an object of the present invention is to provide a slurry containing the carbon black and a lithium ion secondary battery containing the carbon black.

Solution to Problem

The inventors conducted extensive studies in order to address the above problems, and as a result, found that, in carbon black having a large specific surface area, surface properties analyzed through thermal desorption spectroscopy greatly affect the slurry viscosity.

Specifically, the present invention for addressing the above problems is exemplified below.

(1) Carbon black having a specific surface area of 150 $m^2/g$ or more and 400 $m^2/g$ or less, and a ratio ($S_2/S_1$) of a peak area ($S_2$) of a peak at m/z 128 to a peak area ($S_1$) of a peak at m/z 57 detected through thermal desorption spectroscopy of less than 2.00.

(2) The carbon black according to (1), wherein the DBP absorption is 200 mL/100 g or more and 350 mL/100 g or less.

(3) The carbon black according to (1) or (2), wherein the ash content is 0.02 mass % or less.

(4) The carbon black according to any one of (1) to (3), wherein the iron content is less than 2,000 ppb by mass.

(5) A slurry including the carbon black according to any one of (1) to (4) and a dispersion medium.

(6) The slurry according to (5), wherein the viscosity at a shear rate of 10 $s^{-1}$ at 25° C. is 200 mPa·s or more and 1,200 mPa·s or less.

(7) A lithium ion secondary battery, including a positive electrode, a negative electrode and a separator, wherein at least one of the positive electrode and the negative electrode contains the carbon black according to any one of (1) to (4).

Advantageous Effects of Invention

According to the present invention, it is possible to provide a novel carbon black which has a large specific surface area and allows a low-viscosity slurry to be formed. In addition, according to the present invention, it is possible to provide a slurry containing the carbon black and a lithium ion secondary battery containing the carbon black.

DESCRIPTION OF EMBODIMENTS

Figure 1:
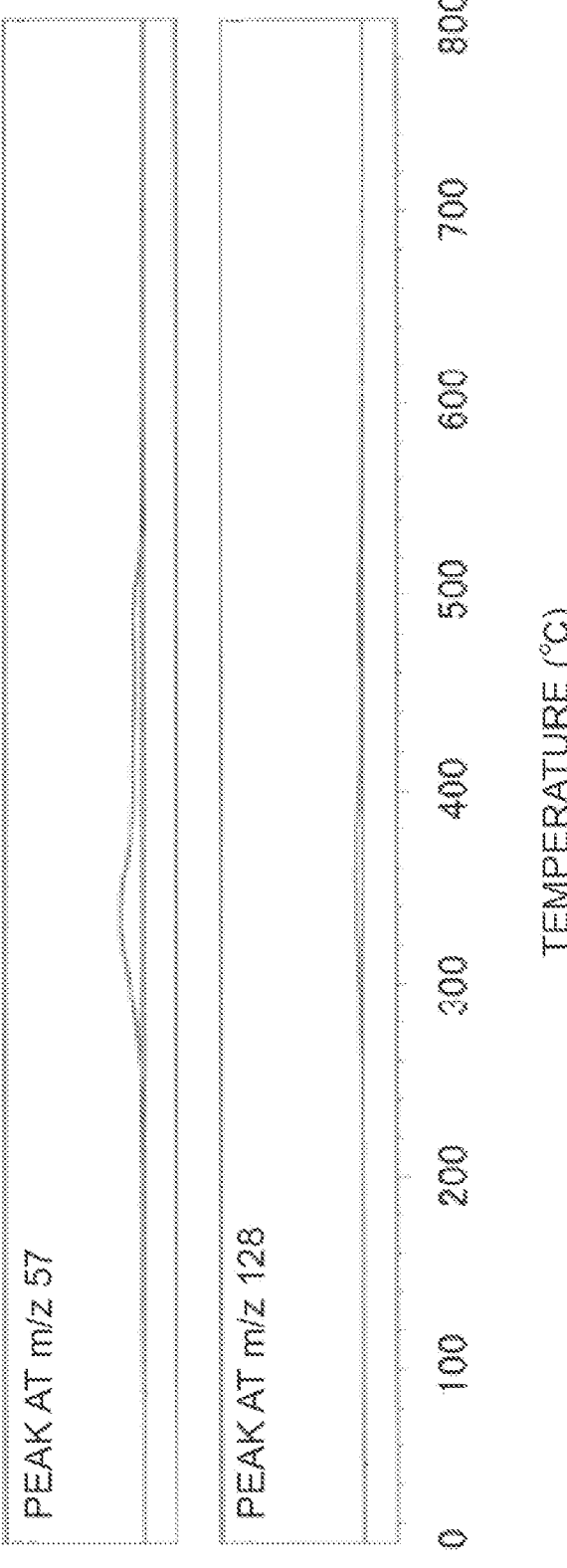
FIG. 1 is a diagram showing a chart of m/z 57 and m/z 128 of carbon black of Example 1 detected through thermal desorption spectroscopy.

Hereinafter, preferable embodiments of the present invention will be described in detail. Here, the present invention is not limited to the embodiments to be described below. Here, in this specification, unless otherwise specified, when a numerical range is indicated using "to," this means a range of the left value "or more" and the right value "or less." For example, "A to B" means A or more and B or less.

<Carbon Black>

Carbon black of the present embodiment has a specific surface area of 150 $m^2/g$ or more and 400 $m^2/g$ or less. This specific surface area is larger than a specific surface area of the carbon black which has been conventionally used as a conductive agent in a lithium ion secondary battery. Carbon black having such a large specific surface area is effective as a conductive agent because it has a strong conductivity-imparting ability due to a percolation effect in a matrix.

Here, the specific surface area is measured according to Method A distribution method (thermal conductivity measurement method) in JIS K 6217-2:2017.

If the specific surface area of carbon black is less than 150 $m^2/g$, the number of contact points with the active material in the mixture layer is reduced and sufficient conductivity may not be exhibited. In order to further improve the conductivity-imparting ability, the specific surface area of carbon black is preferably 160 $m^2/g$ or more, more preferably 180 $m^2/g$ or more, and still more preferably 200 $m^2/g$ or more. That is, the specific surface area of carbon black may be, for example, 150 to 400 $m^2/g$, 160 to 400 $m^2/g$, 180 to 400 $m^2/g$ or 200 to 400 $m^2/g$. In addition, if the specific surface area of carbon black exceeds 400 $m^2/g$, it becomes very difficult to disperse it in the slurry, and parts with poor conductivity are generated locally in the electrode, which may deteriorate battery characteristics. The specific surface area of carbon black can be increased by reducing the particle size of primary particles, making them hollow, and making the surface of particles porous.

In the carbon black of the present embodiment, when the peak area of the peak at m/z 57 detected through thermal desorption spectroscopy is $S_1$ and the peak area of the peak at m/z 128 is $S_2$, the ratio $(S_2/S_1)$ is less than 2.00. Here, the ratio $(S_2/S_1)$ indicates the ratio of organic components adsorbed on the surface of carbon black.

Here, for example, as described in J. Mass Spectrom. Soc. Jpn. Vol. 54, No. 5, 2006, m/z is a symbol indicating the value on the horizontal axis of the mass spectrum. In addition, the number denoted to the right of m/z is a value (dimensionless quantity) obtained by dividing a value of the mass of the target ion divided by the unified atomic mass unit by the ion charge, and a peak position in a mass spectrum is indicated together with m/z.

The ratio $(S_2/S_1)$ can be determined through evolved gas analysis-mass spectrometry (EGA-MS). Specifically, carbon black is set in a gas chromatography mass spectrometer with a thermal decomposition device installed therein, and left at 50° C. in an atmospheric pressure He flow for 5 minutes, and then heated to 800° C. at 80° C./min. Components desorbed by heating are subjected to mass spectrometry under the following conditions, the ratio of the peak area $(S_1)$ of the peak at m/z 57 and the peak area $(S_2)$ of the peak at m/z 128 obtained is obtained, and thereby a ratio $(S_2/S_1)$ is calculated.

Column: Ultra ALLOY-DTM commercially available from Frontier Laboratories Ltd. (length 2.5 m, 0.15 mm I.D, 0.47 mm O.D)

Gas chromatography introduction temperature: 300° C.

Column temperature: 300° C., maintained for 80 minutes

Split ratio: 30:1

Column flow rate: 1.0 mL/min

Ionization method: EI

Measurement range: m/z=10 to 200

Here, in this specification, the peak area is an area of a part surrounded by a horizontal axis baseline with an intensity of 0 and a curve with each detection intensity in a graph of the relationship (for example, FIG. 1) between the temperature and each detection intensity (arbitrary unit) showing components (components corresponding to m/z 57 or m/z 128) detected by desorption from carbon black due to temperature rise in thermal desorption spectroscopy.

The inventors conducted extensive studies in order to address the above problems, and as a result, found that, in carbon black having a large specific surface area, surface properties analyzed through thermal desorption spectroscopy greatly affect the slurry viscosity. That is, when the carbon black of the present embodiment has a ratio $(S_2/S_1)$ of less than 2.00, a sufficiently low slurry viscosity can be achieved with a large specific surface area.

A very small amount of organic components is present on the surface of carbon black due to various reactions during carbon black synthesis (for example, thermal decomposition and combustion reactions of a fuel oil, thermal decomposition and combustion reactions of raw materials, rapid cooling and reaction termination with a cooling medium, and the like), and these organic components are detected through thermal desorption spectroscopy. The detected peak at m/z 128 is a peak derived from polycyclic aromatic hydrocarbons represented by naphthalene, and the peak at m/z 57 is a peak derived from aliphatic hydrocarbons. That is, a small ratio $(S_2/S_1)$ means that the proportion of polycyclic aromatic hydrocarbons present on the surface of carbon black is small. According to the findings by the inventors, in carbon black having a large specific surface area, the contribution of the organic components on the surface to dispersibility is large, and when the proportion of polycyclic aromatic hydrocarbons with strong hydrophobicity present on the surface is small, the affinity and wettability with the dispersion medium are improved, and the slurry viscosity decreases. Here, the organic components of which the presence is speculated from the peaks detected through thermal desorption spectroscopy is completely different from the surface functional groups imparted to conventional carbon black.

In the present embodiment, if the ratio $(S_2/S_1)$ is less than 2.00, even with carbon black with a small particle size, a large specific surface area and a developed structure, it is possible to reduce uneven coating on the current collector and uneven distribution of materials in the electrode due to an increased viscosity of the mixture slurry. In addition, when the dispersion state and contact state of the active material and the conductive agent in the electrode are improved, a high capacity of the lithium ion secondary battery can be achieved while minimizing a local decrease in conductivity and a decrease in the discharging capacity of the battery.

In the present embodiment, due to a large specific surface area of 150 m$^2$/s of carbon black, in order to achieve a sufficiently low slurry viscosity, the ratio ($S_2$/$S_1$) needs to be less than 2.00. In addition, in order to obtain the above effect more significantly, the ratio ($S_2$/$S_1$) may be less than 1.80, less than 1.60, less than 1.40, less than 1.20, less than 1.00, less than 0.80, less than 0.60 or less than 0.50.

The lower limit of the ratio ($S_2$/$S_1$) is not particularly limited, and in order to achieve excellent productivity, the ratio ($S_2$/$S_1$) may be 0.05 or more, 0.10 or more or 0.20 or more. That is, the ratio ($S_2$/$S_1$) may be, for example, 0.05 or more and less than 2.00, 0.05 or more and less than 1.80, 0.05 or more and less than 1.60, 0.05 or more and less than 1.40, 0.05 or more and less than 1.20, 0.05 or more and less than 1.00, 0.05 or more and less than 0.80, 0.05 or more and less than 0.60, 0.05 or more and less than 0.50, 0.10 or more and less than 2.00, 0.10 or more and less than 1.80, 0.10 or more and less than 1.60, 0.10 or more and less than 1.40, 0.10 or more and less than 1.20, 0.10 or more and less than 1.00, 0.10 or more and less than 0.80, 0.10 or more and less than 0.50, 0.20 or more and less than 2.00, 0.20 or more and less than 1.80, 0.20 or more and less than 1.60, 0.20 or more and less than 1.40, 0.20 or more and less than 1.20, 0.20 or more and less than 1.00, 0.20 or more and less than 0.80, 0.20 or more and less than 0.60 or 0.20 or more and less than 0.50.

The DBP absorption of the carbon black of the present embodiment may be, for example, 180 mL/100 g or more, and is preferably 190 mL/100 g or more and more preferably 200 mL/100 g or more. In addition, the DBP absorption of the carbon black of the present embodiment may be, for example, 370 mL/100 g or less, and is preferably 350 mL/100 g or less. That is, the DBP absorption of the carbon black of the present embodiment may be, for example, 180 to 370 mL/100 g, 180 to 350 mL/100 g, 190 to 370 mL/100 g, 190 to 350 mL/00 g, 200 to 370 mL/100 g or 200 to 350 mL/100 g.

The DBP absorption is an index for evaluating the ability to absorb dibutylphthalate (DBP) in voids formed by the carbon black particle surface and structure. In this specification, the DBP absorption is a value obtained by converting the value measured by the method described in JIS K 6221 Method B into a value equivalent to JIS K 6217-4:2008 using the following Formula (a).

$$\text{DBP absorption} = (A - 10.974)/0.7833 \qquad (a)$$

[in the formula, A indicates the value of the DBP absorption measured by the method described in JIS K 6221 Method B] In carbon black with a developed structure, since there are many neck parts formed by fusion of primary particles and voids formed between particles, the DBP absorption increases. If the DBP absorption is too small, since the structure may not be sufficiently developed, the conductivity-imparting ability within the electrode may be low, and it is not possible to buffer the change in volume of the active material due to charging and discharging of the lithium ion secondary battery, and battery characteristics such as cycle characteristics may deteriorate. If the DBP absorption is too large, the binder in the mixture layer is trapped in the structure of carbon black, the adhesion to the active material and the current collector decreases, and battery characteristics may deteriorate.

The average primary particle size of the carbon black of the present embodiment may be, for example, less than 35 nm, and is preferably less than 30 nm, and more preferably less than 25 nm. According to the findings by the inventors, in the carbon black that has the above ratio ($S_2$/$S_1$), when comparing two types having the same specific surface area and different average primary particle sizes, carbon black particles with a smaller particle size have a lower slurry viscosity. This is thought to be because carbon black particles with a larger particle size have a larger specific surface area due to the surface becoming porous, and on the other hand, since carbon black particles with a smaller particle size can achieve a large specific surface area even if the surface is relatively smooth, the area of the surface in contact with the dispersion medium increases, and the above effect due to surface properties represented by the ratio ($S_2$/$S_1$) is exhibited more significantly.

Conventionally, if carbon black particles used as the conductive agent in the lithium ion secondary battery have a small average primary particle size (for example, less than 30 nm), it is difficult to form them into a slurry, but since the carbon black of the present embodiment has the above ratio ($S_2$/$S_1$), it can be formed into a slurry even if the average primary particle size is small (for example, less than 30 nm). When carbon black particles with a small particle size can be used in this manner, high conductivity can be exhibited even if the proportion of carbon black added into the mixture layer is low. The average primary particle size of carbon black particles may be, for example, 1 nm or more, 5 nm or more, or 10 nm or more. That is, the average primary particle size of carbon black particles may be, for example, 1 nm or more and less than 35 nm, 1 nm or more and less than 30 nm, 1 nm or more and less than 25 nm, 5 nm or more and less than 35 nm, 5 nm or more and less than 30 nm, 5 nm or more and less than 25 nm, 10 nm or more and less than 35 nm, 10 nm or more and less than 30 nm, or 10 nm or more and less than 25 nm.

The average primary particle size of carbon black particles can be determined by measuring the primary particle sizes of 100 or more randomly selected carbon black particles from an image enlarged at a magnification of 50,000 under a transmission electron microscope (TEM) and calculating the average value thereof. The primary carbon black particles have a small aspect ratio and a shape close to a true sphere, but the shape is not a perfect true sphere. Therefore, in the present embodiment, the largest size of line segments connecting two points on the outer periphery of primary particles in the TEM image is used as the primary particle size of carbon black particles.

The ash content of the carbon black of the present embodiment may be, for example, 0.05 mass % or less, and is preferably 0.03 mass % or less, and more preferably 0.02 mass % or less. The ash content can be measured according to JIS K 1469:2003, and can be reduced, for example, by classifying carbon black with a device such as a dry cyclone.

The iron content of the carbon black of the present embodiment may be, for example, less than 2,500 ppb by mass, and is preferably less than 2,300 ppb by mass, and more preferably less than 2,000 ppb by mass. The iron content can be reduced by, for example, bringing carbon black into contact with a magnet.

The iron content of carbon black can be measured through high frequency inductively coupled plasma mass spectrometry after a pretreatment in the acid decomposition method according to JIS K 0116:2014. Specifically, the iron content can be measured by the following method. First, 1 g of carbon black is accurately weighed out into a quartz beaker and heated in an atmospheric atmosphere in an electric furnace at 800° C.×3 hr. Then, 10 mL of a mixed acid (70 mass % of hydrochloric acid and 30 mass % of nitric acid) and 10 mL or more of ultrapure water are added to the residue, and the sample is dissolved by heating on a hot plate at 200° C.×1 hr. After cooling, the solution diluted and adjusted to 25 mL with ultrapure water is measured with a high-frequency inductively coupled plasma mass spectrometer (Agilent 8800 commercially available from Agilent).

If the ash content and the iron content of the carbon black of the present embodiment are low, it is possible to more significantly minimize contamination with foreign matter such as metals and ceramics due to damage to a device and the like in a kneading treatment. In addition, it is possible to minimize a decrease in conductivity in the electrode due to contamination with the ash content, insulating foreign matter and the like. Therefore, the carbon black of the present embodiment having a low ash content and iron content can be suitably used for lithium ion secondary batteries for which high safety is required.

A method of producing carbon black of the present embodiment is not particularly limited, and for example, raw materials such as hydrocarbons are supplied from a nozzle installed in the upstream part of the reaction furnace, and carbon black can be produced according to a thermal decomposition reaction and/or combustion reaction and collected from a bag filter directly connected to the downstream part of the reaction furnace.

The raw materials to be used are not particularly limited, and gaseous hydrocarbons such as acetylene, methane, ethane, propane, ethylene, propylene, and butadiene and oily hydrocarbons such as toluene, benzene, xylene, gasoline, kerosene, light oil, and heavy oil can be used. Among these, it is preferable to use acetylene with few impurities. Since acetylene has a higher degree of thermal decomposition than other raw materials and can increase the temperature in the reaction furnace, carbon black nucleation dominates over particle growth according to an addition reaction, and the primary particle size of carbon black particles can be reduced. In addition, the inventors conducted extended studies in order to control surface properties of carbon black, and as a result, found that it is effective to use a plurality of raw materials, heat the raw materials and then supply them to the reaction furnace. It is thought that, in the conventional production method, carbon black generated via the high temperature part of the reaction furnace and carbon black generated via the low temperature part are mixed, and there is a large variation in characteristics, but when the plurality of raw materials are used, the temperature in the reaction furnace becomes uniform, and the reaction history of thermal decomposition and combustion that the sample has undergone also becomes uniform, and thus the proportion of polycyclic aromatic hydrocarbons present on the surface of carbon black decreases. In addition, it is thought that, when raw materials are heated, mixing of the plurality of raw materials is promoted, and a more uniform temperature field is formed. It is preferable to mix the plurality of raw materials before they are supplied to the reaction furnace. When an oily hydrocarbon is used, it is preferable to supply it after gasifying it through heating. The heating method is not particularly limited, and for example, a tank or transport pipe can be heated by heat exchange with a heat medium.

In addition, it is preferable to supply oxygen, hydrogen, nitrogen, steam or the like to the reaction furnace separately from the raw materials as a carbon source. Since gases other than these raw materials promote gas stirring in the reaction furnace, and the frequency of collision and fusion between primary particles of carbon black generated from the raw materials increases, when a gas other than the raw materials is used, the structure of carbon black is developed, and the DBP absorption tends to increase. As a gas other than the raw materials, it is preferable to use oxygen. When oxygen is used, some of the raw materials are combusted, the temperature in the reaction furnace increases, and it becomes easier to obtain carbon black with a small particle size and a large specific surface area. As a gas other than the raw materials, it is possible to use a plurality of gases. A gas other than the raw materials is preferably supplied to the upstream part of the reaction furnace, and preferably supplied from a nozzle separate from that of the raw materials. Accordingly, similarly, the raw materials supplied from the upstream part are efficiently stirred and the structure is easily developed.

In conventional carbon black production, a cooling medium such as water may be introduced from the downstream part of the reaction furnace in order to terminate a thermal decomposition and combustion reaction of the raw materials, but since the structure developing effect was not observed, and on the other hand, since there is a risk of surface properties being affected, it is preferable that no cooling medium be introduced from the downstream part of the reaction furnace in the present embodiment.

<Slurry>

The slurry of the present embodiment contains the carbon black of the present embodiment and a dispersion medium.

If the viscosity of the slurry is too high, since strong shearing is applied during kneading with the active material, the structure of carbon black may break, the conductivity may decrease, and contamination with foreign matter may occur due to wear of the device. On the other hand, if the viscosity of the slurry is too low, carbon black tends to precipitate in the slurry, and it may be difficult to maintain uniformity. In the present embodiment, since the slurry viscosity can be lowered due to use of the above carbon black, breakage of the structure of carbon black can be significantly minimized, an excellent conductivity-imparting ability can be maintained, and contamination with foreign matter due to wear of the device can be significantly minimized. That is, in the present embodiment, the proportion of the active material added to the mixture layer can be increased without impairing viscosity characteristics and conductivity of the slurry, and a high capacity of the lithium ion secondary battery can be achieved.

In order to obtain the above effect more significantly, the viscosity (25° C., a shear rate of 10 s$^{-1}$) of the slurry is preferably 100 mPa·s or more, and more preferably 200 mPa·s or more. Thereby, precipitation of carbon black is reduced, and the uniformity of the slurry is improved. In addition, in order to obtain the above effect more significantly, the viscosity (25° C., a shear rate of 10 s$^{-1}$) of the slurry is preferably 1,500 mPa·s or less, and more preferably 1,200 mPa·s or less. That is, the slurry viscosity (25° C., a shear rate of 10 s$^{-1}$) may be, for example, 100 to 1,500 Pa·s, 100 to 1,200 Pa·s, 200 to 1,500 Pa·s, or 200 to 1,200 Pa·s.

The dispersion medium is not particularly limited, and for example, N-methyl-2-pyrrolidone, ethanol, ethyl acetate or the like can be used.

The slurry of the present embodiment may further contain other carbon blacks, graphite, carbon nanotubes, carbon nanofibers and the like as long as the conductivity-imparting ability and dispersibility of the carbon black of the present embodiment are not impaired.

The slurry of the present embodiment may further contain additives such as an active material and a dispersing agent.

In the slurry of the present embodiment, the content of the carbon black of the present embodiment may be, for example, 0.5 mass % or more and is preferably 1 mass % or more. In addition, in the slurry of the present embodiment, the content of the carbon black of the present embodiment may be, for example, 50 mass % or less and is preferably 20 mass % or less. That is, in the slurry of the present embodiment, the content of the carbon black of the present embodiment may be, for example, 0.5 to 50 mass %, 0.5 to 20 mass %, 1 to 50 mass %, or 1 to 20 mass %.

A method of producing a slurry of the present embodiment is not particularly limited, and for example, it is possible to produce a slurry by kneading respective components using a general device such as a mixer, a kneader, a disperser, a mill, an automatic revolution type rotating device or the like.

The slurry of the present embodiment can be suitably used as an electrode-forming slurry for forming an electrode of a lithium ion secondary battery. The electrode-forming slurry may be a positive electrode-forming slurry or a negative electrode-forming slurry.

When the slurry of the present embodiment is an electrode-forming slurry, the slurry of the present embodiment may contain an active material, a conductive agent and a dispersion medium, and in this case, the slurry contains the carbon black of the present embodiment as a conductive agent.

The content of the conductive agent in the electrode-forming slurry may be, for example, 0.01 mass % or more, and is preferably 0.05 mass % or more, and more preferably 0.08 mass % or more. In addition, the content of the conductive agent in the electrode-forming slurry may be, for example, 20 mass % or less, and is preferably 15 mass % or less and more preferably 10 mass % or less. That is, the content of the conductive agent in the electrode-forming slurry may be, for example, 0.01 to 20 mass %, 0.01 to 15 mass %, 0.01 to 10 mass %, 0.05 to 20 mass %, 0.05 to 15 mass %, 0.05 to 10 mass %, 0.08 to 20 mass %, 0.08 to 15 mass %, or 0.08 to 10 mass %.

The electrode-forming slurry may further contain a conductive agent other than carbon black. Examples of conductive agents other than carbon black include graphite, carbon nanotubes, and carbon nanofibers.

In the electrode-forming slurry, the proportion of carbon black in the conductive agent may be, for example, 50 mass % or more, and is preferably 70 mass % or more, more preferably 90 mass % or more, and may be 100 mass %.

The active material is not particularly limited, and known active materials used in lithium ion secondary batteries can be used without particular limitation. Examples of positive electrode active materials include lithium cobaltate, lithium nickelate, lithium manganate, nickel/manganese/lithium cobaltate, and lithium iron phosphate. Examples of negative electrode active materials include carbonaceous materials such as natural graphite, artificial graphite, graphite, activated carbon, coke, needle coke, fluid coke, mesophase microbeads, carbon fibers, and pyrolytic carbon.

The electrode-forming slurry may further contain a binder. The binder is not particularly limited, and known binders used in lithium ion secondary batteries can be used without particular limitation. Examples of binders include polyethylene, nitrile rubber, polybutadiene, butyl rubber, polystyrene, styrene/butadiene rubber, polysulfide rubber, nitrocellulose, carboxymethylcellulose, polyvinyl alcohol, polytetrafluoroethylene resins, polyvinylidene fluoride, and polychloroprene fluoride.

A method of forming an electrode using an electrode-forming slurry is not particularly limited, and for example, an electrode-forming slurry is applied onto a current collector and dried, and thus an electrode containing a current collector and a mixture layer can be formed.

The current collector is not particularly limited, and for example, metal foils formed of gold, silver, copper, platinum, aluminum, iron, nickel, chromium, manganese, lead, tungsten, titanium, or alloys mainly composed of these are used. For example, an aluminum foil is preferably used for the positive electrode current collector, and a copper foil is preferably used for the negative electrode current collector.

<Lithium Ion Secondary Battery>

The lithium ion secondary battery of the present embodiment includes a positive electrode, a negative electrode and a separator. In addition, in the lithium ion secondary battery of the present embodiment, at least one of the positive electrode and the negative electrode contains the above carbon black of the present embodiment. In the lithium ion secondary battery of the present embodiment, at least one of the positive electrode and the negative electrode may be formed from the above electrode-forming slurry, and at least one of the positive electrode and the negative electrode may include a mixture layer formed on the current collector from the above electrode-forming slurry.

The lithium ion secondary battery of the present embodiment has a high capacity because the carbon black of the present embodiment is used, and can be produced using the above electrode-forming slurry with favorable productivity.

In the lithium ion secondary battery of the present embodiment, the positive electrode preferably contains the above carbon black of the present embodiment. In addition, in the lithium ion secondary battery of the present embodiment, the positive electrode is preferably formed from the above electrode-forming slurry, and the positive electrode more preferably includes a mixture layer formed on the current collector from the above electrode-forming slurry.

In the lithium ion secondary battery of the present embodiment, the configuration other than the electrode containing the carbon black of the present embodiment may be the same as that of a known lithium ion secondary battery.

The separator is not particularly limited, and separators known as separators for lithium ion secondary batteries can be used without particular limitation. Examples of separators include synthetic resins such as polyethylene and polypropylene. The separator is preferably a porous film because it retains the electrolytic solution well.

The lithium ion secondary battery of the present embodiment may include an electrode group in which positive electrodes and negative electrodes are laminated or wound with separators therebetween.

In the lithium ion secondary battery of the present embodiment, a positive electrode, a negative electrode and a separator may be immersed in the electrolytic solution.

The electrolytic solution is not particularly limited, and may be, for example, a non-aqueous electrolytic solution containing a lithium salt. Examples of non-aqueous solvents in the non-aqueous electrolytic solution containing a lithium salt include ethylene carbonate, propylene carbonate, diethyl carbonate, dimethyl carbonate, and methyl ethyl carbonate. In addition, examples of lithium salts that can be dissolved in the non-aqueous solvent include lithium hexafluorophosphate, lithium borotetrafluoride, and lithium trifluoromethanesulfonate.

In the lithium ion secondary battery of the present embodiment, an ion conducting polymer or the like may be used as an electrolyte.

While preferable embodiments of the present invention have been described above, the present invention is not limited to the above embodiments.

For example, one aspect of the present invention may be an evaluation method of evaluating carbon black having a specific surface area of 150 m$^2$/g or more and 400 m$^2$/g or less. The evaluation method may include a measuring process in which a ratio ($S_2$/$S_1$) of a peak area ($S_2$) of a peak at m/z 128 to a peak area ($S_1$) of a peak at m/z 57 detected through thermal desorption spectroscopy is determined and an evaluating process in which carbon black is evaluated using the ratio ($S_2$/$S_1$).

The evaluating process may be a selecting process in which carbon black having a ratio ($S_2$/$S_1$) of less than 2.00 is selected. In this case, the evaluation method can also be called a carbon black selecting process.

EXAMPLES

Hereinafter, the present invention will be described in more detail with reference to examples, but the present invention is not limited to these examples.

Example 1

<Production of Carbon Black>

Carbon black was produced by supplying acetylene at 12 Nm$^3$/h and toluene at 32 kg/h, where were raw materials, and oxygen at 20 Nm$^3$/h as a gas other than the raw materials, from a nozzle installed in the upstream part of the carbon black reaction furnace (with a furnace length of 6 m, a furnace diameter of 0.65 m), and performing collection through a bag filter installed in the downstream part of the reaction furnace. Then, the sample was passed through a dry cyclone device and an iron removal magnet and collected in a tank. Here, acetylene, toluene, and oxygen were heated to 115° C. and then supplied to the reaction furnace. The following physical properties of the obtained carbon black were measured. The evaluation results are shown in Table 1.

(1) Specific Surface Area

The specific surface area was measured according to JIS K 6217-2:2017 Method A distribution method (thermal conductivity measurement method).

(2) Ratio ($S_2$/$S_1$) Determined Through Thermal Desorption Spectroscopy 2 to 5 mg of carbon black was weighed out in a sample cup and set in a gas chromatograph mass spectrometer ("QP-2010" commercially available from Shimadzu Corporation) with a thermal decomposition device ("PY-2020iD" commercially available from Frontier Laboratories Ltd.) installed therein. The sample was left at 50° C. in an atmospheric pressure He flow for 5 minutes, and then heated to 800° C. at 80° C./min, and the desorbed components were detected through mass spectrometry under the following conditions. The peak area ratio ($S_2$/$S_1$) was calculated using the determined ratio of peak areas at m/z 128 and m/z 57. Here, FIG. 1 a diagram showing a chart of m/z 57 and m/z 128 of carbon black of Example 1 detected through thermal desorption spectroscopy.

column: Ultra ALLOY-DTM commercially available from Frontier Laboratories Ltd. a length of 2.5 m, 0.15 mm I.D, 0.47 mm O.D
    Gas chromatography introduction temperature: 300° C.
    Column temperature: 300° C., maintained for 80 minutes
    Split ratio: 30:1
    Column flow rate: 1.0 mL/min
    Ionization method: EI
    Mass range: m/z=10 to 200

(3) DBP absorption: obtained by converting a value measured by the method described in JIS K 6221 Method B into a value equivalent to JIS K 6217-4:2008 using Formula (a).

(4) average primary particle size: determined by measuring primary particle sizes of 100 or more randomly selected carbon black particles from an image at a magnification of 50,000 under a transmission electron microscope and calculating the average value thereof.

(5) ash content: measured according to JIS K 1469:2003.

(6) iron content: the iron content was measured through high frequency inductively coupled plasma mass spectrometry after a pretreatment in the acid decomposition method according to JIS K 0116:2014.

Preparation of Slurry 3 parts by mass of carbon black and 97 parts by mass of N-methyl-2-pyrrolidone (commercially available from Kanto Chemical Co., Inc.) as a dispersion medium were kneaded using a rotation/revolution mixer ("Awatori Rentaro ARV-310" commercially available from Thinky Corporation) at a rotational speed of 2,000 rpm for 30 minutes to produce a carbon black slurry. The viscosity of this slurry at 25° C. was evaluated using a viscoelasticity measuring machine (commercially available from AntonPaar "MCR102", <φ30 mm, using a cone plate with an angle of 3°, a gap of 1 mm). Measurement was performed by changing the shear rate from 0.01 s$^{-1}$ to 100 s$^{-1}$, and the viscosity at a shear rate of 10 s$^{-1}$ was obtained. The measurement results are shown in Table 2.

<Production of Battery>

40 parts by mass of a carbon black slurry (1.2 parts by mass of carbon black, 38.8 parts by mass of N-methyl-2-pyrrolidone), 96.8 parts by mass of LiNi$_{0.5}$Mn$_{0.3}$Co$_{0.2}$O$_2$ ("TX10" commercially available from Umicore) as a positive electrode active material, 2 parts by mass of polyvinylidene fluoride ("HSV900" commercially available from Arkema) as binder, 0.1 parts by mass of polyvinyl alcohol ("B05" commercially available from Denka Co., Ltd.) as a dispersing agent, and 10 parts by mass of N-methyl-2-pyrrolidone (commercially available from Kanto Chemical Co., Inc.) as a dispersion medium were kneaded using a rotation/revolution mixer ("Awatori Rentaro ARV-310" commercially available from Thinky Corporation) at a rotational speed of 2,000 rpm for 10 minutes to produce a positive electrode-forming mixture slurry. The obtained positive electrode-forming mixture slurry was applied onto an aluminum foil with a thickness of 15 μm (commercially available from UACJ) with an applicator, and dried at 105° C. for 1 hour in advance. Next, the sample was pressed with a roll press machine at 200 kg/cm, and the sum of the thicknesses of the aluminum foil and the coating film was adjusted to 80 μm. In order to remove volatile components, vacuum-drying was performed at 170° C. for 3 hours to produce a positive electrode.

97 parts by mass of artificial graphite ("MA G-D" commercially available from Hitachi Chemical Company) as a negative electrode active material, 2 parts by mass of styrene butadiene rubber ("BM-400B" commercially available from Zeon Corporation) as a binder, and 1 part by mass of carboxymethyl cellulose ("D2200" commercially available from Daicel Corporation) as a dispersing agent were weighed out, pure water was added thereto, and mixing was performed using a rotation/revolution mixer (Awatori Rentaro ARV-310 commercially available from Thinky Corporation) to produce a negative electrode-forming mixture slurry. The obtained negative electrode-forming mixture slurry was applied onto a copper foil with a thickness of 10 μm (commercially available from UACJ) with an applicator, and dried at 60° C. for 1 hour in advance. Next, the sample was pressed with a roll press machine at 100 kg/cm, and the sum of the thicknesses of the copper foil and the coating film was adjusted to 40 μm. In order to completely remove water, vacuum-drying was performed at 120° C. for 3 hours to produce a negative electrode.

The positive electrode was processed to 40×40 mm, the negative electrode was processed to 44×44 mm, and a polyolefin microporous film as a separator was disposed between both electrodes to produce a battery. An electrolytic solution obtained by dissolving 1 mol/L of lithium hexafluorophosphate (commercially available from Stellachemifa Corporation) in a solution in which ethylene carbonate (commercially available from Aldrich)/dimethyl carbonate (commercially available from Aldrich) were mixed at a volume ratio of 1/1 was used.

As a battery discharge test, the produced battery was charged with a constant current and constant voltage limited to 4.35 V and 0.2C at 25° C. and then discharged to 3.0 V at a constant current of 0.2C. Next, the discharge current was changed to 0.2C, 0.5C, 1C, 2C, and 3C, and a discharging capacity for each discharge current was measured. The capacity retention rate during 3C discharge relative to 0.2C discharge was calculated, and evaluated as a discharge rate characteristic. In addition, the produced battery was charged with a constant current and constant voltage limited to 4.35 V and 1C at 25° C. and then discharged to 3.0 V at a constant current of 1C. Next, the charging and discharging were repeated 500 cycles, and the discharging capacity was measured. The capacity retention rate during discharge for 500 cycles relative to discharge for 1 cycle was calculated and evaluated as a cycle characteristic. The measurement results are shown in Table 2.

Examples 2 to 4

Carbon black was produced and evaluated in the same manner as in Example 1 except that the oxygen supply rate was changed to 21 Nm³/h (Example 2), 22 Nm³/h (Example 3) or 24 Nm³/h (Example 4). The results are shown in Table 1. In addition, using the obtained carbon black and a battery were prepared and evaluated in the same manner as in Example 1. The results are shown in Table 2.

Example 5

Carbon black was produced and evaluated in the same manner as in Example 1 except that the temperature at which toluene was supplied was changed to 100° C. and the oxygen supply rate was changed to 21 Nm³/h. The results are shown in Table 1. In addition, using the obtained carbon black, a slurry and a battery were prepared and evaluated in the same manner as in Example 1. The results are shown in Table 2.

Example 6

Carbon black was produced and evaluated in the same manner as in Example 1 except that the temperature at which acetylene was supplied was changed to 85° C., the temperature at which toluene was supplied was changed to 100° C., and the oxygen supply rate was changed to 21 Nm³/h. The results are shown in Table 1. In addition, using the obtained carbon black, a slurry and a battery were prepared and evaluated in the same manner as in Example 1. The results are shown in Table 2.

Example 7

Carbon black was produced and evaluated in the same manner as in Example 1 except that the temperature at which acetylene was supplied was changed to 85° C., the temperature at which toluene was supplied was changed to 85° C., and the oxygen supply rate was changed to 21 Nm³/h. The results are shown in Table 1. In addition, using the obtained carbon black, a slurry and a battery were prepared and evaluated in the same manner as in Example 1. The results are shown in Table 2.

Example 8

Carbon black was produced and evaluated in the same manner as in Example 1 except that the acetylene supply rate was changed to 11 Nm³/h, the toluene supply rate was changed to 30 kg/h, and the oxygen supply rate was changed to 19 Nm³/h. The results are shown in Table 1. In addition, using the obtained carbon black, a slurry and a battery were prepared and evaluated in the same manner as in Example 1. The results are shown in Table 2.

Example 9

Carbon black was produced and evaluated in the same manner as in Example 1 except that the acetylene supply rate was changed to 13 Nm³/h, the toluene supply rate was changed to 35 kg/h, and the oxygen supply rate was changed to 26 Nm³/h. The results are shown in Table 1. In addition, using the obtained carbon black, a slurry and a battery were prepared and evaluated in the same manner as in Example 1. The results are shown in Table 2.

Example 10

Carbon black was produced and evaluated in the same manner as in Example 1 except that 12 Nm³/h of ethylene was heated to 115° C. and supplied in place of acetylene and the oxygen supply rate was changed to 22 Nm³/h. The results are shown in Table 1. In addition, using the obtained carbon black, a slurry and a battery were prepared and evaluated in the same manner as in Example 1. The results are shown in Table 2.

Example 11

Carbon black was produced and evaluated in the same manner as in Example 1 except that 32 kg/h of benzene was heated to 115° C. and supplied in place of toluene and the oxygen supply rate was changed to 21 Nm³/h. The results are shown in Table 1. In addition, using the obtained carbon black, a slurry and a battery were prepared and evaluated in the same manner as in Example 1. The results are shown in Table 2.

Comparative Example 1

Carbon black was produced and evaluated in the same manner as in Example 1 except that 21 Nm³/h of hydrogen was heated to 115° C. and supplied in place of oxygen. The results are shown in Table 1. In addition, using the obtained carbon black, a slurry and a battery were prepared and evaluated in the same manner as in Example 1. The results are shown in Table 2.

Comparative Example 2

Carbon black was produced and evaluated in the same manner as in Example 1 except that the acetylene supply rate

15 was changed to 11 Nm³/h, the toluene supply rate was changed to 30 kg/h, and the oxygen supply rate was changed to 24 Nm³/h. The results are shown in Table 1. In addition, using the obtained carbon black, a slurry and a battery were prepared and evaluated in the same manner as in Example 1. The results are shown in Table 2.

Example 12

The carbon black obtained in Comparative Example 1 was oxidized in an electric furnace heated to 720° C. to obtain carbon black. The obtained carbon black was evaluated in the same manner as in Example 1. The results are shown in Table 1. In addition, using the obtained carbon black, a slurry and a battery were prepared and evaluated in the same manner as in Example 1. The results are shown in Table 2.

Example 13

Carbon black was produced and evaluated in the same manner as in Example 1 except that the oxygen supply rate was changed to 21 Nm³/h, and the ash content was adjusted by changing classification conditions in a dry cyclone device. The results are shown in Table 1. In addition, using the obtained carbon black, a slurry and a battery were prepared and evaluated in the same manner as in Example 1. The results are shown in Table 2.

Example 14

Carbon black was produced and evaluated in the same manner as in Example 1 except that the oxygen supply rate was changed to 21 Nm³/h and the iron content was adjusted by changing magnetic flux density conditions for the iron removal magnet. The results are shown in Table 1. In addition, using the obtained carbon black, a slurry and a battery were prepared and evaluated in the same manner as in Example 1. The results are shown in Table 2.

Comparative Example 3

Carbon black was produced and evaluated in the same manner as in Example 1 except that the acetylene supply rate was changed to 38 Nm³/h and the oxygen supply rate was changed to 10 Nm³/h without supplying toluene. The results are shown in Table 1. In addition, using the obtained carbon black, a slurry and a battery were prepared and evaluated in the same manner as in Example 1. The results are shown in Table 2.

Comparative Example 4

Figure 2:
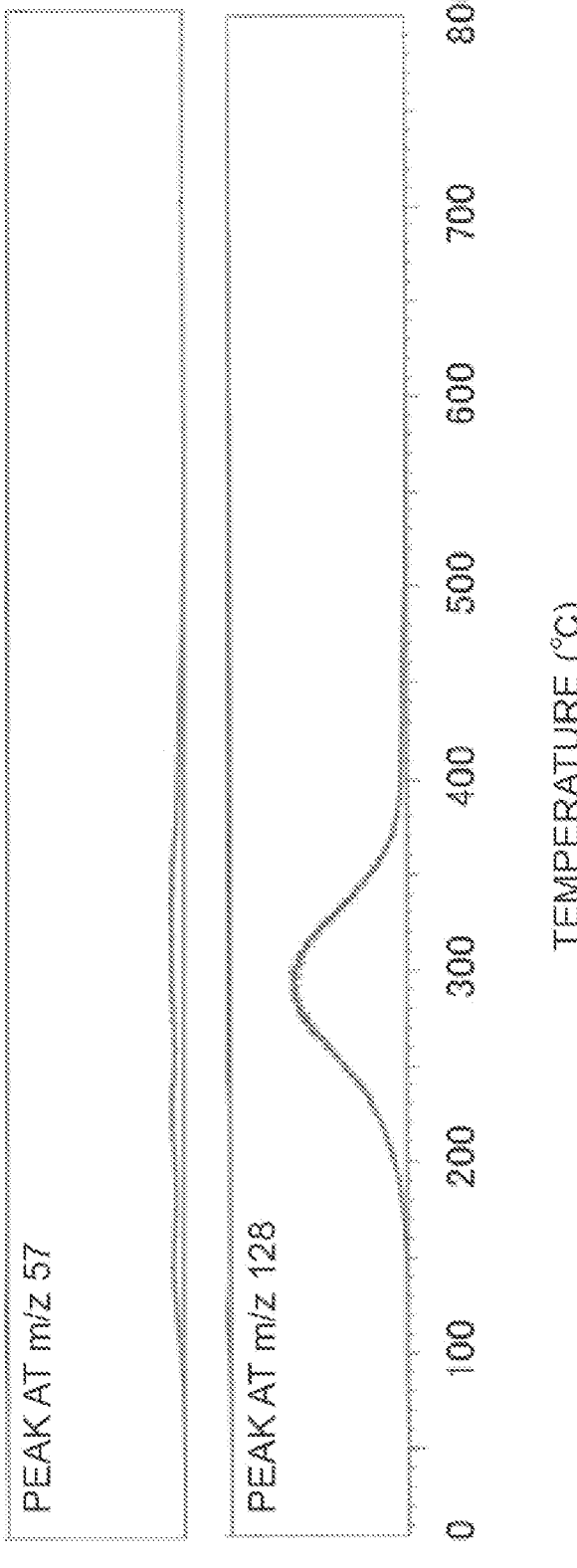
FIG. 2 is a diagram showing a chart of m/z 57 and m/z 128 of carbon black of Comparative Example 4 detected through thermal desorption spectroscopy.

Carbon black was produced and evaluated in the same manner as in Example 1 except that the oxygen supply rate was changed to 22 Nm³/h, and the temperature at which acetylene was supplied, the temperature at which toluene was supplied, and the temperature at which oxygen was supplied were all changed to 25° C. The results are shown in Table 1. Here, FIG. 2 is a diagram showing a chart of m/z 57 and m/z 128 of carbon black of Comparative Example 4 detected through thermal desorption spectroscopy. In addition, using the obtained carbon black, a slurry and a battery were prepared and evaluated in the same manner as in Example 1. The results are shown in Table 2.

16

TABLE 1

| | Carbon black | | | | | |
| | Specific surface area (m²/g) | Ratio ($S_2/S_1$) | DBP absorption (mL/100 g) | Average primary particle size (nm) | Ash content (%) | Iron content (ppb by mass) |
|---|---|---|---|---|---|---|
| Example 1 | 154 | 0.27 | 221 | 24 | 0.01 | 1390 |
| Example 2 | 178 | 0.44 | 239 | 22 | 0.01 | 1470 |
| Example 3 | 242 | 0.40 | 252 | 20 | 0.01 | 1550 |
| Example 4 | 376 | 0.25 | 318 | 17 | 0.02 | 1870 |
| Example 5 | 180 | 0.55 | 237 | 22 | 0.01 | 1580 |
| Example 6 | 176 | 1.56 | 235 | 22 | 0.01 | 1440 |
| Example 7 | 176 | 1.86 | 238 | 22 | 0.01 | 1500 |
| Example 8 | 158 | 0.26 | 198 | 24 | 0.01 | 1610 |
| Example 9 | 384 | 0.39 | 365 | 17 | 0.02 | 1780 |
| Example 10 | 153 | 0.71 | 204 | 24 | 0.02 | 1700 |
| Example 11 | 213 | 0.32 | 246 | 21 | 0.01 | 1660 |
| Example 12 | 156 | 0.30 | 220 | 27 | 0.01 | 1320 |
| Example 13 | 178 | 0.43 | 240 | 22 | 0.03 | 1440 |
| Example 14 | 179 | 0.45 | 238 | 22 | 0.01 | 2200 |
| Comparative Example 1 | 137 | 0.23 | 226 | 26 | 0.01 | 1240 |
| Comparative Example 2 | 422 | 0.27 | 338 | 16 | 0.02 | 1780 |
| Comparative Example 3 | 181 | 2.22 | 246 | 22 | 0.01 | 1100 |
| Comparative Example 4 | 160 | 3.37 | 210 | 23 | 0.01 | 1450 |

TABLE 2

| | Slurry | Battery characteristics | |
| | Viscosity (25° C., 10 s$^{-1}$) (mPa · s) | Discharge rate characteristic (%) | Cycle characteristic (%) |
|---|---|---|---|
| Example 1 | 340 | 76 | 78 |
| Example 2 | 550 | 83 | 80 |
| Example 3 | 700 | 86 | 85 |
| Example 4 | 960 | 90 | 84 |
| Example 5 | 660 | 80 | 80 |
| Example 6 | 820 | 78 | 79 |
| Example 7 | 1140 | 76 | 79 |
| Example 8 | 350 | 75 | 75 |
| Example 9 | 1020 | 89 | 78 |
| Example 10 | 270 | 75 | 77 |
| Example 11 | 610 | 85 | 83 |
| Example 12 | 450 | 74 | 76 |
| Example 13 | 540 | 82 | 79 |
| Example 14 | 550 | 82 | 80 |
| Comparative Example 1 | 170 | 59 | 70 |
| Comparative Example 2 | 1650 | 66 | 74 |
| Comparative Example 3 | 1800 | 65 | 77 |
| Comparative Example 4 | 1300 | 62 | 71 |

As shown in Table 1, it was confirmed that, when the carbon black of examples was used, an excellent slurry viscosity characteristic and excellent battery characteristics were realized, and a high-performance lithium ion secondary battery was obtained using the carbon black of the present invention with favorable productivity.

INDUSTRIAL APPLICABILITY

The carbon black of the present invention can be preferably used for the slurry for lithium ion secondary battery electrodes and lithium ion secondary batteries.

The invention claimed is:

1. Carbon black having a specific surface area of 150 m$^2$/g or more and 400 m$^2$/g or less, and a ratio (S$_2$/S$_1$) of a peak area (S$_2$) of a peak at m/z 128 to a peak area (S$_1$) of a peak at m/z 57 detected through thermal desorption spectroscopy of 0.05 or more and less than 2.00.

2. The carbon black according to claim 1,
   wherein a DBP absorption is 200 mL/100 g or more and 350 mL/100 g or less.

3. The carbon black according to claim 1,
   wherein an ash content is 0.02 mass % or less.

4. The carbon black according to claim 1,
   wherein an iron content is less than 2,000 ppb by mass.

5. A slurry comprising the carbon black according to claim 1 and a dispersion medium.

6. The slurry according to claim 5,
   wherein a viscosity at a shear rate of 10 s$^{-1}$ at 25° C. is 200 mPa·s or more and 1,200 mPa·s or less.

7. A lithium ion secondary battery, comprising a positive electrode, a negative electrode and a separator,
   wherein at least one of the positive electrode and the negative electrode contains the carbon black according claim 1.

* * * * *